US012737708B2

(12) United States Patent
Milojicic et al.

(10) Patent No.: US 12,737,708 B2
(45) Date of Patent: Sep. 15, 2026

(54) PROVIDING WORKFLOW SOLUTIONS THAT COMPLY WITH DEVELOPMENT AND OPERATIONS PREFERENCES

(71) Applicant: HEWLETT PACKARD ENTERPRISE DEVELOPMENT LP, Spring, TX (US)

(72) Inventors: Dejan S. Milojicic, Milpitas, CA (US); Eitan Frachtenberg, Portland, OR (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 22 days.

(21) Appl. No.: 18/783,731

(22) Filed: Jul. 25, 2024

(65) Prior Publication Data

US 2026/0030577 A1 Jan. 29, 2026

(51) Int. Cl.
*G06Q 10/0633* (2023.01)
*G06Q 10/10* (2023.01)

(52) U.S. Cl.
CPC ....... *G06Q 10/0633* (2013.01); *G06Q 10/103* (2013.01)

(58) Field of Classification Search
CPC ... G06Q 10/06; G06Q 10/0633; G06Q 10/103
See application file for complete search history.

(56) References Cited

U.S. PATENT DOCUMENTS

| | | | | |
|---|---|---|---|---|
| 2007/0236708 | A1* | 10/2007 | Jahn | G06Q 10/06 358/1.6 |
| 2017/0316363 | A1* | 11/2017 | Siciliano | G06Q 10/06316 |
| 2017/0331920 | A1* | 11/2017 | Iqbal | H04L 41/20 |
| 2018/0152506 | A1* | 5/2018 | Simó | G06Q 10/06 |
| 2021/0383289 | A1* | 12/2021 | Dmitriev | G06F 9/3555 |
| 2023/0072246 | A1* | 3/2023 | Kirchhof | H04L 67/75 |

OTHER PUBLICATIONS

D. D. Zeng and J. L. Zhao, "Achieving software flexibility via intelligent workflow techniques," Proceedings of the 35th Annual Hawaii International Conference on System Sciences, Big Island, HI, USA, 2002, pp. 606-615.*

(Continued)

*Primary Examiner* — Timothy Padot
(74) *Attorney, Agent, or Firm* — Trop, Pruner & Hu, P.C.

(57) ABSTRACT

A technique includes receiving a workflow request. The request is associated with a given role of a plurality of user roles. The technique includes providing a workflow solution to comply with the collection of development and operation preferences. Providing the workflow solution includes identifying a plurality of candidate workflow solutions. Identifying the plurality of candidate workflow solutions includes, for a given candidate workflow solution, selecting the given candidate workflow solution based on the collection of preferences and templates corresponding to respective workloads of the given candidate workflow solution. Providing the workflow solution includes ranking the plurality of candidate workflow solutions; and responsive to the ranking, selecting a candidate workflow solution and providing an attestation corresponding to the selected workflow solution.

11 Claims, 8 Drawing Sheets

(56) References Cited

OTHER PUBLICATIONS

S. Gesing et al., "Workflows in a Dashboard: A New Generation of Usability," 2014 9th Workshop on Workflows in Support of Large-Scale Science, New Orleans, LA, USA, 2014, pp. 82-93.*
EFlows4HPC Project; "Enabling dynamic and intelligent work-flows in the future EuroHPC ecosysem"; "eFlows4HPC overview"; website: https://eflows4hpc.readthedocs.io/en/latest/Sections/0_Intro.html; downloaded Jul. 24, 2024; 2 pp.
EFlows4HPC Project; "Enabling dynamic and intelligent work-flows in the future EuroHPC ecosysem"; "Software Stack"; https://eflows4hpc.readthedocs.io/en/latest/Sections/01_Software_Stack.html; downloaded Jul. 24, 2024; 2 pp.
EFlows4HPC Project; "Enabling dynamic and intelligent work-flows in the future EuroHPC ecosysem"; "Programming Interfaces for integrating HPC and DA/ML workflows"; https://eflows4hpc.readthedocs.io/en/latest/Sections/02_Programming_Interfaces.html; downloaded Jul. 24, 2024; 2 pp.
EFlows4HPC Project; "Enabling dynamic and intelligent work-flows in the future EuroHPC ecosysem"; "HPCWaaS Methodol-ogy"; https://eflows4hpc.readthedocs.io/en/latest/Sections/03_HPCWaaS_Methodology.html; downloaded Jul. 24, 2024; 2 pp.
EFlows4HPC Project; "Enabling dynamic and intelligent work-flows in the future EuroHPC ecosysem"; "Step-by-step Example"; https://eflows4hpc.readthedocs.io/en/latest/Sections/04_Usage_Example.html; downloaded Jul. 24, 2024; 3 pp.

* cited by examiner

604

RECEIVE, BY PROCESSOR-BASED RECOMMENDATION AGENT, REQUEST FOR WORKFLOW SOLUTION, WHERE REQUEST IS ASSOCIATED WITH GIVEN USER ROLE OF PLURALITY OF USER ROLES, AND REQUEST IS ASSOCIATED WITH COLLECTION OF PREFERENCES FOR WORKFLOW SOLUTION

608

RESPONSIVE TO REQUEST:

- IDENTIFY, BY RECOMMENDATION AGENT, PLURALITY OF CANDIDATE WORKFLOW SOLUTIONS, WHERE IDENTIFYING PLURALITY OF CANDIDATE WORKFLOW SOLUTIONS INCLUDES, FOR GIVEN CANDIDATE WORKFLOW SOLUTION, SELECTING GIVEN CANDIDATE WORKFLOW SOLUTION BASED ON COLLECTION OF PREFERENCES AND TEMPLATES CORRESPONDING TO RESPECTIVE WORKLOADS OF GIVEN CANDIDATE WORKFLOW SOLUTION
- RANK, BY RECOMMENDATION AGENT, PLURALITY OF CANDIDATE WORKFLOW SOLUTIONS
- RESPONSIVE TO RANKING, SELECT, BY RECOMMENDATION AGENT, CANDIDATE WORKFLOW SOLUTION TO PROVIDE SELECTED WORKFLOW SOLUTION AND PROVIDE ATTESTATION CORRESPONDING TO SELECTED WORKFLOW SOLUTION

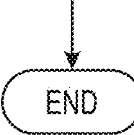

PROVIDING WORKFLOW SOLUTIONS THAT COMPLY WITH DEVELOPMENT AND OPERATIONS PREFERENCES

BACKGROUND

Business enterprises rely on computer-based workflows to provide solutions for a wide range of problems. A computer-based workflow may include any of a number of different workloads, such as data analytics (DA) workloads, high performance computing (HPC) workloads and artificial intelligence (AI) workloads.

BRIEF DESCRIPTION OF THE DRAWINGS

FIG. 6 is a flow diagram depicting a technique to provide a workflow solution according to an example implementation.

FIG. 8 is an illustration of a non-transitory storage medium that stores machine-readable instructions that, when executed by a system, cause the system to provide a workflow solution according to an example implementation.

DETAILED DESCRIPTION

Figure 1:
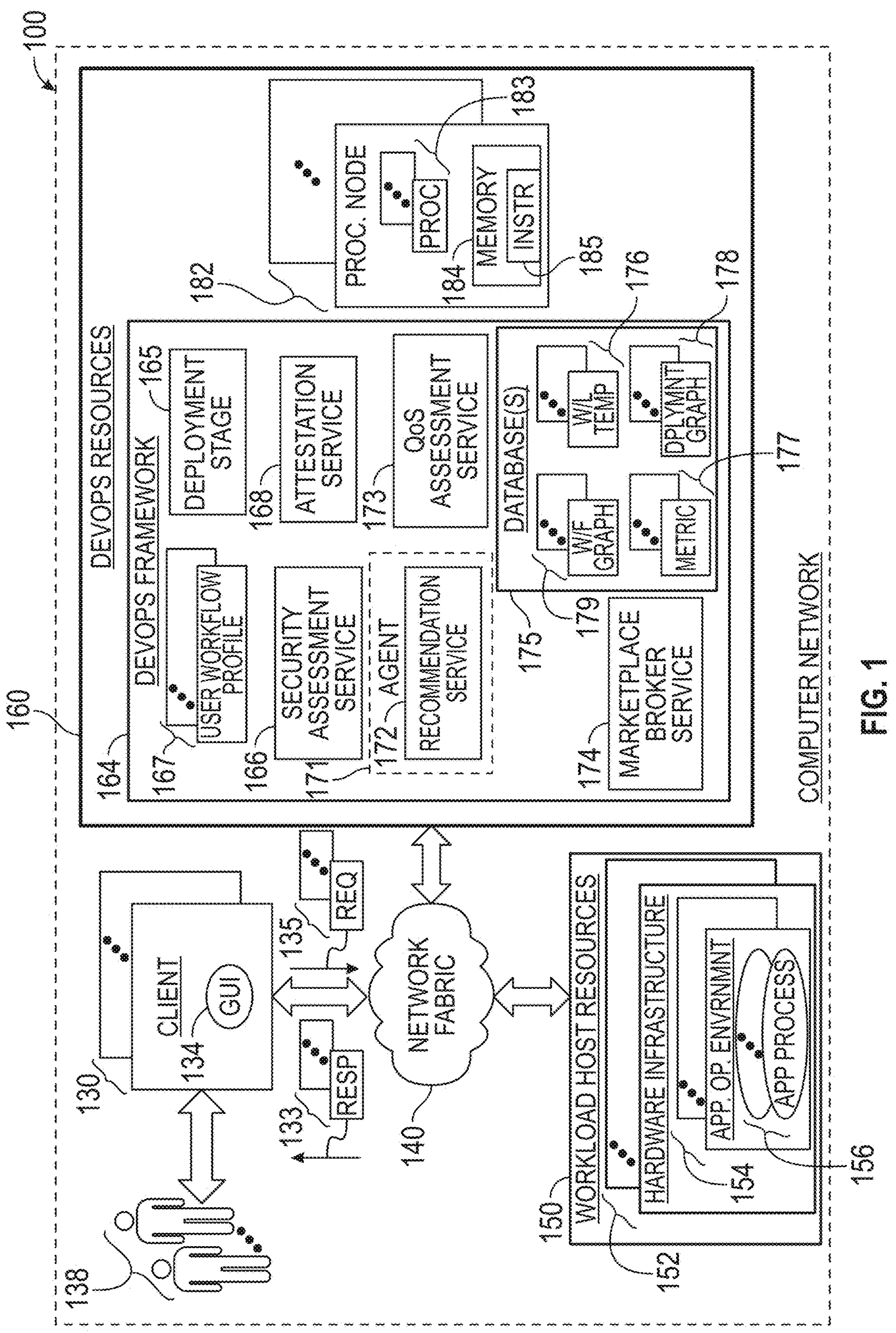
FIG. 1 is a block diagram of a computer network that includes a development and operations (DevOps) automation framework to provide workflow solutions according to an example implementation.

A computer-based workflow (called a "workflow" herein) is an arrangement of workloads to achieve a particular goal, or result. In this context, a "workload" (or "computer-based workload") refers to a collection of one or multiple application processes. The workloads of a workflow may execute in one or multiple application operating environments (e.g., container clusters, containers, virtual machines, bare-metal machines or other ecosystems) and are hosted on one or multiple hardware infrastructures (e.g., on-premise computers, private clouds, public clouds, or other systems). A workload may be associated with any of a number of different application classifications, or types. In examples, a given workload may perform processing related to data analytics (DA), high performance computing (HPC) or artificial intelligence (AI). In other examples, workloads may be associated with business enterprise applications, event-driven applications, graphics processing, as well as other applications that address other needs.

A workflow may be directed to solving any of a number of different problems. In an example, a workflow may have DA-related workloads for such purposes as data mining, automobile traffic optimization, fraudulent banking activity detection, cybersecurity intrusion detection, climate forecasting and providing solutions for other problems by finding patterns and correlations in voluminous datasets. In another example, a workflow may have HPC-related workloads that process data in parallel for such purposes as scientific research, animation, hydrocarbon reservoir analyses, aircraft design, fluid dynamics analyses, genomics and providing solutions for other computationally-complex problems. In another example, a workflow may have AI-related workloads that that learn and improve for such purposes as data inference, complex task automation, image, audio, and video recognition and generation, manufacturing defect recognition and providing solutions for other problems using machine learning-based models.

A given workflow may include a combination of workloads that correspond to different application categories, or types. For example, a workflow may include one or multiple DA-related workloads to identify patterns and correlations in a voluminous dataset, and these patterns and correlations may serve as features that are processed by one or multiple AI-related workloads of the workflow. In another example, a workflow may include an AI-related workload that relies on one or multiple HPC-related workloads of the workflow to perform computationally-complex processing (e.g., processing related to parameter tuning or model estimation). Similarly, AI can be used for computational steering in HPC applications.

Designing a workflow solution may be a daunting task for a number of different reasons. For example, a given workflow solution may have an intricate design and rely on a considerable number of selections, or choices (called "preferences" or "criteria" herein), for the design. In examples, designing a workflow solution may include, among other selections, selecting workload functionalities; selecting a processing ordering of the workloads; selecting specific applications and application architectures; selecting application operating environments; and selecting supporting hardware infrastructures. Designing a workflow solution may be further complicated by the merger of different application categories, such as DA, HPC and AI workloads, which may span a wide range of technical expertise.

Moreover, a workflow solution may be the result of a collaboration among a number of human users having different roles and different levels of expertise. For example, a user in the role of "end user" for a particular workflow may want a certain overall functionality and certain performance for the workflow. In a more specific example, an end user may desire certain functionalities for a workflow solution (e.g., the end user may want the workflow to solve a particular fluid dynamics problem or want the workflow to use certain applications). In another more specific example, an end user may prefer certain performance preferences for a workflow solution, such as the workflow solution providing a result within a certain time or the workflow solution allowing access and modifications to certain models of the deployed workflow. The end user, however, may not know or even want to know about specific underlying details of the workflow solution in order to be able to use it. In another example, a user in the role of "software developer" (or "developer") may be involved in designing certain aspects (e.g., the selection of certain application architectures or particular application operating environments) of a particular workflow solution, but the developer may not know or need to know some details (e.g., details about the supporting hardware infrastructures) of the final workflow solution.

Users in roles that are not directly involved in constructing a workflow solution may also contribute criteria, or preferences, which constrain the workflow solution. For example, a business enterprise's governance committee may impose certain constraints (e.g., a certain pricing structure or particular security preferences) on all workflows for the business enterprise. In another example, a regulator (e.g., a government regulator for a particular jurisdiction) may impose certain constraints (e.g., geographical restrictions on datacenter locations and privacy-related constraints) on workflows. In another example, operators (e.g., cloud service operators) for resources that host workloads of a workflow solution may impose certain constraints (e.g., constraints related to application operating environments or hardware infrastructures). The preferences collectively contributed by users in their respective roles dictate that a workflow solution delivers a certain functionality, has a certain performance, operates in a secure way and complies with a certain budget.

In accordance with example implementations that are described herein, a development and operations (DevOps) approach is used to design, deploy, monitor and improve workflow solutions. DevOps, in general, refers to a methodology for providing a software-based product, which through automation and collaboration, combines development and operations teams. In accordance with example implementations, a DevOps automation framework (called the "DevOps framework" herein) abstracts the details of a workflow solution while accommodating preferences that are provided by users having a number of different user roles. In examples, the user roles may correspond to developer, end user, entity governance, operator, regulator, community group, as well as other and/or different user roles. In the context used herein, a "role" (or "user role") refers to a characterization that may be associated with one or multiple principals (e.g., human users, or "users"). Users, in a variety of different roles, may contribute preferences for a particular workflow solution, in accordance with a minimum use model.

The aggregated set of preferences provided by users for a particular workflow solution is referred to herein as a "user workflow profile." In an example, a workflow profile may specify one or multiple functionalities for a workflow. In examples, these functionalities may be related to the overall, or main, functionality for the workflow solution, such as solving a certain fluid dynamics problem or automating a particular business function. A particular functionality may also be related to a particular subpart of the workflow solution, such as, in examples, the use of a distributed computing system for singular value decomposition or a particular workload or group of workloads providing data replication.

In another example, a workflow profile may specify one or multiple security-related criteria. Security-related criteria, in general, establish guidelines for protecting computer systems against security attacks, data exfiltration and other harm, theft, damage or unauthorized use. In examples, security-related criteria may specify a minimum standard for securing access to data, a minimum standard for protecting data in transit, a minimum standard for access control or geographical restrictions.

In another example, a workflow profile may specify one or multiple performance-related criteria, such as resource usage criteria (e.g., limits on certain resources) and quality-of-service (QoS) criteria. QoS criteria, in general, are guidelines that regulate the user experience. In an example, QoS criteria may specify that 95% of requests must execute under one second. In another example, QoS criteria may specify that a system is to serve up to one million requests per second with a latency degradation no larger than ten milliseconds.

In another example, a workflow profile may specify cost criteria. Cost criteria, in general, establishes guidelines for the pricing of the workflow solution. In examples, cost criteria may set forth a certain pricing structure or model, a maximum cost or a price range.

In the context that is used herein, a "workflow solution" refers to a design that corresponds to a particular sequence, or arrangement, of workloads, which complies with a particular collection of user preferences. A workflow solution, in accordance with example implementations, includes more components than just a sequence of workloads. In another example, a workflow solution may specify specific application operating environments to host certain application processes. In another example, a workflow solution may identify specific operating systems for certain application operating environments. In another example, a workflow solution may identify specific firmware images. In another example, a workflow solution may identify specific firmware versions. In another example, a workflow solution may identify specific hardware infrastructures that host application operating environments.

In accordance with example implementations, a workflow solution may include an attestation. In an example, the attestation may include data that represents a manifest of specifically-identified components of the workflow solution including applications, hardware infrastructures, operating systems, firmware images, application operating environments and a topography, or graph (called a "workload graph" herein), of the workflow. In an example, an attestation may be cryptographically signed, and correspondingly, the workflow solution may include a signature, or hash, of the attestation. The combination of a signature and an attestation may be used to deploy, verify and enforce a workflow solution.

The DevOps framework, in accordance with example implementations, incorporates both development preferences and operations preferences into a workflow solution. In an example, a particular workflow solution may satisfy development preferences (e.g., a microservice-based application architecture) that enhance the speed at which updates (e.g., patches and upgrades) may be introduced to a deployed workflow. In another example, certain development preferences (e.g., the use of certain machine-learning algorithms and certain application operating environments) may accommodate a larger number of available workloads and/or accommodate a larger number of available workflows. In an example, a particular workflow solution may satisfy operations preferences, such as preferences to enhance the monitoring of a deployed workflow. In another example, certain operations preferences may ease the burden of deploying or scaling a workflow. In another example, certain operations preferences may harden a deployed workflow against security attacks. In the context that is used herein, a "development preference" for a workflow solution refers to a criterion associated with the planning, coding, building or testing of a workflow. Moreover, in the context that is used herein, an "operations preference" for a workflow solution refers to a criterion that specifies how the workflow solution, once deployed, operates and may be related to the release, functioning, management, or monitoring of a workflow. As can be appreciated a given preference may be both a development preference and an operations preference.

In accordance with example implementations, the DevOps framework includes a recommendation agent that is constructed to provide recommended workflow solutions that comply with corresponding workflow profiles. In accordance with example implementations, the recommendation agent, for purposes of providing a particular workflow solution, searches one or multiple libraries for workflows and/or workloads that satisfy the preferences of a corresponding workflow profile. In examples, the libraries may be private libraries owned and maintained by a particular business enterprise, as well as publicly-available libraries. For example, the DevOps framework may be affiliated with a particular business enterprise, and private libraries may document performances, functionalities, security-related attributes and costs of workloads and workflows used by the business entity in the past. In another example, the recommendation agent may also search publicly-available libraries for documented workflows and workloads that satisfy the workflow profile's preferences. In an example, as a result of the search, the recommendation agent may identify one or multiple candidate workflows that satisfies the workflow profile's preferences. In another example, as a result of the search, the recommendation agent may not identify any previously-used workflows that satisfy the preferences. However, the search may reveal workloads from which the recommendation agent may construct one or multiple candidate workflows that satisfy the preferences.

In accordance with example implementations, the DevOps framework includes one or multiple services that are used by the recommendation agent for purposes of determining whether a particular workflow or workload under evaluation meets the workflow profile's preferences. In an example, the DevOps framework includes a marketplace broker service that tracks pricing models and current prices, or costs, for different applications, application operating environments and hardware infrastructures. The recommendation agent may, for example, use the pricing information that is provided by the marketplace broker service for purposes of determining whether a particular candidate workflow meets one or multiple cost preferences of the workflow profile.

In another example, the DevOps framework includes a security service to track security attributes, or characteristics, of applications, application operating environments and hardware infrastructures. The recommendation agent may use the security service to, as examples, determine a geographic location of a particular hardware infrastructure, determine access control governance imposed by a particular application operating environment or determine security constraints imposed by particular application operating environment to inflight data.

In another example, the DevOps framework includes a QoS service to track QoS attributes of applications, application operating environments and hardware infrastructures. The recommendation agent may use the QoS service to, as examples, determine various QoS attributes of applications, application operating environments and hardware infrastructures.

As a result of searching the libraries and considering the workflow profile preferences, the recommendation agent may therefore identify, or determine, one or multiple candidate workflow solutions. For the case in which the recommendation agent identifies a single candidate workflow solution, this solution becomes the recommended workflow solution. For the case in which the recommendation agent identifies multiple candidate workflow solutions, then the recommendation agent applies selection criteria for purposes of selecting and therefore recommending a workflow solution. As described further herein, in accordance with some implementations, the recommendation agent may assign scores to the candidate workflow solutions, rank the candidate workflow solutions based on the scores and select the highest-ranked candidate workflow solution. Moreover, as described further herein, the selection of workflow solutions may involve the recommendation agent considering priorities or importances that are assigned to different user roles.

FIG. 1 depicts a computer network 100 in accordance with example implementations. Referring to FIG. 1, in accordance with example implementations, the computer network 100 includes resources 160 (called "DevOps resources 160" herein) that host a DevOps automation framework 164 (called the "DevOps framework 164" herein). The DevOps resources 160 may have any of a number of different architectures. In an example, the DevOps resources 160 are cloud-based resources that are provided by a public cloud service provider that provides and manages cloud services over the Internet to customers of the cloud service provider. In this context, "cloud" or "cloud-based" resources refer to on-demand and scalable software and/or hardware resources. In an example, the DevOps framework 164 is provided "as-a-service" to users (e.g., employees) of a subscribing business entity.

In another example, the DevOps resources 160 correspond to a business enterprise's private network. In an example, the DevOps resources 160 may be part of a business enterprise's private cloud and may be located in the business enterprise's private datacenter or located in leased space of a co-location datacenter. Stated differently, the DevOps resources 160 may be "on-premise" resources. In an example, the business enterprise may manage the on-premise resources. In another example, the DevOps resources 160 are on-premise resources and are managed by a cloud service provider, instead of being managed by the business enterprise. In another example, the DevOps resources 160 are part of a hybrid cloud, which is a mixture of private and public clouds. In another example, the DevOps resources 160 are on-premise and non-cloud-based resources.

Human users 138 may interact with the DevOps framework 164 for a variety of different purposes, including requesting workflow solutions and providing workflow solution preferences. As depicted in FIG. 1, the users 138 may be associated with one or multiple client devices 130 that are connected by network fabric 140 to the DevOps resources 160. In examples, a client device 130 may be a tablet device, a portable computer, a desktop computer, a smartphone, or any processor-based platform. Moreover, the client devices 130 may be a heterogenous mixture of a wide range of processor-based platform architectures. In accordance with example implementations, the network fabric 140 may be associated with one or multiple types of communication networks, such as (as examples) Fibre Channel networks, Compute Express Link (CXL) fabric, dedicated management networks, local area networks (LANs), wide area networks (WANs), global networks (e.g., the Internet), wireless networks, or any combination thereof.

Among the interactions with the DevOps framework 164, the users 138 may be associated with a number of different roles (or "user roles") and collectively provide criteria, or preferences, for requested workflow solutions. The aggregation of preferences for a particular workflow solution is referred to herein as a user workflow profile 167. A workflow solution, in example implementations that are described herein, is requested via a corresponding workflow request 135. In an example, a given user 138, in the role of "end user," submits a workflow request 135 to the DevOps framework 164.

In an example, a workflow request 135 may be an application programming interface (API) request (e.g., a REST API request or a gPRC request) to an API that is provided by a recommendation agent 171. The recommendation agent 171 provides a workflow solution recommendation service 172 (called the "recommendation service 172" herein). The recommendation agent 171, in general, processes workflow requests 135 and provide responses 133 that contain data representing recommended workflow solutions.

As its name implies, a workflow request 135 is an inquiry for a workflow solution. The workflow request 135, as further described herein, may be relatively general or relatively specific. For example, a relatively general workflow request 135 may specify no, one or a limited number of preferences for the workflow solution. As another example, a relatively specific workflow request 135 may specify a considerable number of preferences for the workflow solution and may even specify an attestation for the workflow solution. Users 138 that are associated with roles other than "end user," may interact with the DevOps framework 164 for purposes of contributing additional workflow solution preferences to a particular user workflow profile 167.

A workflow solution includes a particular sequence, or arrangement, or workloads. A workload includes one or multiple application processes. The application processes of a workload are related. In an example, a workload includes multiple application processes that operate under the same identity to perform a certain function. In another example, workload may be a collection of application processes that operate under different identities but are related due to an overarching collaborative effort (e.g., a collection of application processes involved in a move-making effort or other venture in which users pass intermediate results to each other). A given application may include multiple workloads.

A given workflow solution may have any of a number of associated components in addition to indicating an arrangement of workloads. In an example, a workflow solution has an assigned workflow name (e.g., a unique name to distinguish the workflow solution from other workflow solutions). In another example, a workflow solution includes a graph (herein called a "workflow graph") of workloads. In an example, nodes of a workflow graph may correspond to respective workloads, and edges of the graph connect nodes and associated with conditions for transitioning among the workloads. In another example, a workflow solution includes a deployment graph. In an example, the nodes of a deployment graph may correspond to resources (e.g., hardware infrastructures and application operating environments) that host the workloads, and the edges of a deployment graph may represent relationships (e.g., relationships among application operating environments and hardware infrastructures) among the hosting resources.

In accordance with example implementations, a user workflow profile 167 includes criteria that belongs to one or multiple of the following classifications, or categories: functionality, performance (e.g., QoS, reliability, resource usages, maximum processing times for workloads, and so forth), cost and security. Users 138, in a variety of different roles, may submit preferences for a particular workflow solution, in accordance with a minimum use model. The users 138 may be affiliated with a number of different roles inside and outside of a business entity that benefits from and uses the workflow solution. In examples, the roles may correspond to end users of the workflows, software developers, regulators (e.g., government regulators), business entity governance and operators (e.g., cloud operators). With the wide variety of roles, there may be a corresponding wide range of goals, or preferences, for a particular workflow solution.

In an example, an end user 138 may specify one or multiple functionalities for a workflow solution in a workflow request 135. In an example, an end user 138 may submit a workflow request 135 and identify the overall, or main, functionality of the workflow to be detecting manufacturing defects in a product. In another example, an end user 138 may submit a workflow request 135 and, in the workflow request 135, specify on overall functionality pertaining to solving a particular fluid dynamics problem. In other examples, end users 138 may request workflow solutions related to climate prediction, hydrocarbon reservoir analysis, social media sentiment analysis, engineering design, bank fraud detection, or any other workflow functionality to solve a problem using AI, DA or HPC or a combination of AI, DA and/or HPC. Requested functionalities may be more specific than the overall goal of the workflow solution, such as, for example, functionalities for certain workloads. Moreover, as further described herein, a given workflow request 135 may contain preferences other than functionality preferences. A user workflow profile 167 may therefore contain preferences derived from a particular workflow request 135 provided by an end user 138, as well as preferences provided by users in other roles other than the end user 138.

In an example, an end user 138 may generate a workflow request 135 using a dashboard, or graphical user interface (GUI) 134. In an example, the GUI 134 identifies a user-navigable collection of selectable workflow functionalities. In an example, the GUI 134 may be provided via machine-readable instructions being executed on a client device 130. The GUI 134 may also allow the end user 138 to select an existing workflow solution or one or multiple components (e.g., workflow solution components corresponding to certain functionalities or certain workloads) of an existing workflow solution. In an example, the GUI 134 corresponds to a web site that is served by the DevOps framework 164.

In an example, a relatively general workflow request 135 contains data that represents the following information:

<workflow name>

In this example, the DevOps framework 164 assigns the provided workflow name to the workflow solution and determines the components of the workflow solution based on the preferences in the corresponding user workflow profile 167. In accordance with example implementations, the DevOps framework 164 includes a recommendation agent 171 that provides a workflow solution recommendation service 172. In addition to any preferences being provided as part of the workflow request 135, the recommendation agent 171 determines preferences for the workflow solution from the corresponding user workflow profile 167. In an example, the recommendation agent 171 associates end users 138 with particular respective workflow profiles 167. Therefore, a workflow request 135 that merely specifies a workflow name is sufficient information from which the recommendation agent 171 may construct a workflow solution.

As described herein, a user workflow profile 167 may contain preferences affiliated with roles other than end user. In example, these other roles may include roles corresponding to one or multiple of the following: operators (e.g., cloud operators), business entity governance, government regulator, user community and developer. The criteria in a user workflow profile 167 may include various criteria associated with a functionality, cost, security and/or, performance for the workflow solution. The recommendation agent 171, in response to a workflow request 135, determines a workflow solution based on the corresponding workflow profile 137 and provides a response 133 that contains data representing the recommended workflow solution. In an example, the end user 138 may review, accept or reject the recommended workflow solution (e.g., access or reject via a GUI 134). If accepted, the recommendation agent 171 may then provide the recommended workflow solution to a deployment stage 165 of the DevOps framework 165, which initiates actions to deploy the workflow on workload host resources 150.

In an example, a workflow request 135 that is more specific than the example above may contain data that represents the following information:

<workflow name> <graph of workloads>

In this example, the workflow request 135 specifies a graph of the workloads and therefore identifies the specific workloads (e.g., identifies the specific applications) and further identifies the arrangement of the workloads. The recommendation agent 171 determines additional components of a recommended workflow solution, such as the supporting application operating environments and hardware infrastructures for the workloads based on the corresponding user workflow profile 167. Moreover, as in the previous example, the recommendation agent 171 provides a response 133 containing data representing the recommended workflow solution.

In another example, a workflow request 135 that is more specific than the examples above contains data that represents the following information:

<workflow name> <graph of workloads> <deployment graph>

In this example, the workflow request 135 further identifies preferential aspects of the workload deployment, such as application operating environment types (e.g., virtual machines and container clusters) and hardware infrastructure types (e.g., public cloud, private cloud and on-premise computers) for the workloads. The recommendation agent 171 determines, based on the corresponding user workflow profile 167, additional components of the workflow solution, such as the specific application operating environment details (e.g., the number of nodes, the type of guest operating system(s), the number of container pods), specific hardware infrastructure details (e.g., the specific providers, the number of servers) and the attestation. Moreover, as in the previous examples, the recommendation agent 171 provides a response 133 containing data that represents the recommended workflow solution.

In another example, a workflow request 135 that is more specific than the examples above contains data that represents the following information:

<workflow name> <graph of workloads> <deployment graph> <QoS>

In this example, the workflow request 135 further identifies a QoS preference for the workflow solution. The DevOps framework 164 adds the QoS preference to the user workflow profile 167, and the recommendation agent 171 determines, based on the user workflow profile 167, additional details of the workflow solution, such as the specific application operating environment details, specific hardware infrastructure details and attestation. The recommendation agent 171 provides a response 133 containing data that represents the recommended workflow solution.

In another example, a workflow request 135 contains data that represents a complete or near complete workflow solution:

<workflow name> <graph of workloads> <deployment graph> <QoS> <attestation>

In an example, the DevOps framework 164 sends back a response 133 prompting the end user 138 to confirm that the workflow solution is to be deployed, and in response to the end user 138 confirming the deployment, the recommendation agent 171 provides the workflow solution to the deployment stage 165. In another example, the DevOps framework 164, in response to the workflow request 135, sends the workflow solution described by the request 135 to the deployment stage 165.

Functionality preferences for a given workflow solution may range from a more general functionality, such as the overall, or main, goal of the workflow solution (e.g., a function of solving a particular fluid dynamics problem), to a more specific functionality. In an example, a functionality preference may specify a minimum storage tier for workflow solution. In another example, a functionality preference may specify a distributed system for singular value decomposition. In another example, a functionality preference may specify a particular type of machine learning model (e.g., recurrent neural network (RNN)). In another example, a functionality preference may specify high availability (HA) for compute nodes of a workload or another fault tolerance measure. In another example, a functionality preference may specify a particular workload is to use a container cluster (e.g., specify the use of a Kubernetes cluster). In another example, a functionality preference may specify that a particular workload is an HPC, DA or AI workload. In another example, a functionality preference may specify that a minimum number of compute nodes for a workload. In another example, a functionality preference may specify data replication. In another example, a functionality preference may be a particular network overlay. In another example, a functionality preference may be a specified function for a particular workload. In another example, a functionality preference may be a particular application. In another example, a functionality preference may be a particular operating system for a particular application operating environment. In another example, a functionality preference may be a particular firmware image for a particular application operating environment. In another example, a functionality preference may be a particular hardware infrastructure (e.g., a public cloud, a vertical cloud, a private cloud).

A performance preference may be any of a number of different metrics for characterizing a workflow, characterizing a particular workload of the workflow or characterizing a part of the workflow corresponding to multiple workloads. In an example, a performance preference may be a resource usage constraint. In an example, a resource usage constraint may be a maximum CPU utilization. In another example, a resource usage constraint may be a maximum memory utilization. In another example, a resource usage constraint may be a maximum disk utilization. In another example, resource usage constraint may be maximum processing time for a workload or a maximum processing time for the workflow to derive a solution. In another example, a resource usage constraint may be a minimum number of available pods of a container cluster of a particular workload or a maximum number of unavailable pods. In another example, a resource usage constraint may be a maximum network latency.

A performance preference may be a QoS constraint. In an example, QoS constraint may specify a minimum time rate for executing user requests. In another example, a QoS constraint may specify that a minimum time rate for serving requests with an upper limit on latency degradation. In another example, a QoS constraint may specify a maximum error time rate associated with workload. In another example, a QoS preference may be a maximum time rate of requests performed by a workload.

A user workflow profile 167 may also include one or multiple security preferences for a workflow, a workload of a workflow, or a collection of workloads for a workflow. In an example, a security preference may specify a geographical restriction for data storage. In another example, a security preference may specify a geographical restriction for a workload. In another example, a security preference may be a minimum standard for identity verification. In another example, a security preference may be a minimum security standard for communication between workloads. In another example, a security preference may be a restriction on communication between workloads. In another example, a security preference may be remote attestation of resources supporting workloads. In another example, a security preference may be a minimum standard for security intrusion monitoring. In an example, a security preference may be a particular encryption standard for communications. In an example, a security preference may be measured and trusted boots for compute nodes that host the workloads.

A user workflow profile 167 may also include one or multiple cost preferences for a workflow, a workload of a workflow, or a collection of workloads for a workflow. In an example, a cost preference may be a particular cost model (e.g., a particular time-based or resource usage-based cloud pricing model) for one or multiple workloads. In another example, a cost preference may be a maximum time-based cost per workflow iteration. In another example, a cost preference may be a maximum resource usage-based cost per workflow iteration. In another example, a cost preference may be a maximum subscription cost for one or multiple workloads. In another example, a cost preference may be an overall cost for an iteration of the workflow. In another example, a cost preference may be a maximum monthly cost for the workflow or a maximum cost for the workflow over another time period.

As depicted in FIG. 1, in accordance with some implementations, the DevOps resources 160, the client devices 130 and the workload host resources 150 may be interconnected by the network fabric 140. The workload host resources 150 include one or multiple hardware infrastructures 152. In this context, a "hardware infrastructure" refers to a collection of actual, or physical, resources (e.g., hardware processors, input/output (I/O) devices, memory, network controllers and other devices) that support the execution of machine-readable instructions (or "software"). For implementations that include multiple hardware infrastructures 152, the infrastructures 152 operate independently from each other and may be owned and managed by different entities. Moreover, the hardware infrastructures 152 may be a heterogenous mixture of different hardware infrastructure types, or categories.

In an example, a particular hardware infrastructure 152 may include a collection of servers and other physical resources (e.g., networking devices and storage devices) associated with a public cloud. In another example, a particular hardware infrastructure 152 may be a collection of resources associated with a private cloud. In another example, a particular hardware infrastructure 152 may be a collection of resources that are tailored to support a certain industry and which may be referred to as a "vertical cloud." In another example, a particular hardware infrastructure 152 may be a collection of resources associated with a community cloud. In another example, a particular hardware infrastructure may be a collection of resources associated with a hybrid cloud. In another example, a hardware infrastructure 152 may be non-cloud-based. For example, a hardware infrastructure 152 may include on-premise devices (e.g., servers, networking devices and one or multiple storage arrays) of a business enterprise. For example, a business enterprise may use the DevOps framework 164 to recommend and deploy a workflow solution to on-premise equipment of the business enterprise.

A given hardware infrastructure 152 may host one or multiple application operating environments 154. In this context, an "application-operating environment" refers to an ecosystem in which one or multiple application processes 156 (corresponding to one or multiple workloads) execute. In an example, an application-operating environment 154 is a bare-metal environment that is created by an operating system having direct access to the hardware of the hardware infrastructure 152. In another example, an application-operating environment 154 is a virtual machine. In another example, an application-operating environment 154 is a container environment. The container environment may be non-orchestrated or orchestrated (e.g., a Kubernetes cluster). In another example, an application environment 154 may be a combination of the foregoing, such as a container environment inside a virtual machine.

As can be appreciated, a given workflow solution may include multiple workloads that are hosted on a mixture of clouds and on-premise computers. Moreover, the workloads for a given workflow solution may include application processes 156 that execute in a mixture of bare metal, container and virtual-machine software environments 154. In accordance with some implementations, the workloads may be provided as services. In an example, a workload directed to DA may correspond to a DA-as-a-service that is provided by a cloud provider. In other examples, workloads directed to HPC and AI may correspond to a cloud-provided HPC-as-service and AI-as-a-service.

In accordance with further implementations, the workloads and the DevOps framework 164 may be hosted, in full or in part, by shared resources. For example, in accordance with further implementations, a cloud provider may provide cloud-based services (e.g., HPC-as-a-service, DA-as-a-service, AI-as-a-service) that correspond to one or multiple workloads of a workflow, and the cloud provider may further provide the Dev-Ops framework 164 as a service.

The deployment of a workflow, in accordance with example implementations, includes the deployment stage 165 deploying one or multiple programs (e.g., pyCOMPS programs) that build task graphs at runtime. In this manner, at runtime, the execution of the program(s) result in scheduling, parallelism implementation, resource allocations and data transfer decisions associated with the workflow.

In accordance with example implementations, the DevOps framework 164 includes one or multiple databases 175. In accordance with example implementations, the database 175 stores data representing one or multiple workflow graphs 179. In accordance with example implementations, each workflow graph 179 corresponds to a workflow solution previously recommended by the recommendation agent 171 and deployed by the DevOps framework 164.

The database(s) 175 may further include a collection of data representing one or multiple workload templates 176. A given workload may be defined by a definition, or template, such as a Topology and Orchestration Specification for Cloud Applications (TOSCA) template. A workload template describes a topology of components (e.g., Kubernetes nodes, virtual machines, or other components) of the workload, connections among the components, dataflows and ways in which processes may interact with the components. A workload template may also define capabilities of the corresponding workload, such as specifying performance and security metrics.

The database(s) 175, in accordance with some implementations, may include a collection of data corresponding to historical, or observed, metrics 177. In accordance with some implementations, the metrics 177 are observed QoS metrics or other performance metrics for previously-deployed workflows. In this manner, as further described herein, the recommendation agent 171 may search the workflow graphs 179 for purposes of determining whether a corresponding workflow meets the preferences that are set forth in the user workflow profile 167 for the requested workflow solution. As also described herein, this search may reveal multiple candidate workflow solutions, which the recommendation agent 171 evaluates for purposes of determining the candidate workflow solution, which becomes the recommended workflow. For purposes of identifying the candidate workflow solutions and selecting the recommended workflow, the recommendation agent 171 may consider the historical, or observed, metrics 177 to determine whether the candidate workflow solutions satisfy the corresponding user workflow profile 167.

The recommendation agent 171 may consider other metrics determined by services of the DevOps framework 164, such as a security assessment service 166, a marketplace broker service 174 and a QoS assessment service 173. The security assessment service 166, in accordance with example implementations, determines security metrics associated with a particular candidate workflow solution. In this manner, the security service 166, in accordance with example implementations, may update the metrics 177 for observed workflows, as well as update the metrics to accommodate the most recent security metrics for particular workloads. The marketplace broker service 174, in accordance with example implementations, retrieves the latest cost models and pricing for various workloads, and the recommendation agent 171 may use the marketplace broker service 174 for purposes of retrieving cost information for workloads under evaluation. The QoS assessment service 173 retrieves and updates the metrics 177 for the latest QoS metric values for the workloads under evaluation.

In accordance with example implementations, the recommendation agent 171 may not identify a particular workflow from the workflow graphs 179 but may instead construct a candidate workflow solution from the workload templates 176. In accordance with some implementations, the set of candidate workflow solutions considered by the recommendation agent 171 may include one or multiple workflows previously deployed by the DevOps framework 164 as well as one or multiple candidate workflow solutions constructed from the workflow templates 176.

A candidate workflow solution, in accordance with example implementations, is further associated with a particular deployment graph. As depicted in FIG. 1, in accordance with example implementations, the database(s) 175 includes one or multiple deployment graphs 178 for historical workflow deployments by the DevOps framework 164. Therefore, a particular candidate workflow solution includes a workflow graph 179, one or multiple associated workload templates 176 and an associated deployment graph 178. Moreover, a particular candidate workflow solution may have one or multiple historical, or observed, metrics 177.

In accordance with example implementations, a workflow solution includes an attestation. An attestation may include a manifest of components of the workflow solution. In an example, the manifest may specifically identify applications, application operating environments and hardware infrastructures corresponding to the workflow solution. Moreover, In accordance with example implementations, the attestation may be cryptographically-signed and include a corresponding signature (e.g., a hash). In accordance with example implementations, an attestation service 168 of the DevOps framework 164 may generate an attestation for a particular workflow solution.

In accordance with example implementations, the DevOps resources 160 includes one or multiple processing nodes 182. Each processing node 182, in accordance with example implementations, includes one or multiple hardware processors 183. In an example, one or multiple hardware processors 183 on one or multiple processing nodes 182 may execute machine-readable instructions, such as machine-readable instructions 185 that are stored in a memory 184, for purposes of providing one or multiple software components of the DevOps framework 164. These software components include one or multiple of the recommendation agent 171, the security assessment service 166; the attestation service 168; the marketplace broker service 174; and the QoS assessment service 173. In accordance with further implementations, a hardware processor 183 may be a hardware circuit that does not execute machine-executable instructions, such as an application specific integrated circuit (ASIC), field programmable gate array (FPGA), programmable logic device, a programmable logic device (PLD), or other hardware dedicated to providing one or multiple functions for the DevOps framework 164.

The memory 184 represents a collection of non-transitory storage devices, such as semiconductor storage devices, memristor-based storage devices, magnetic storage devices, phase change memory devices, a combination of devices of one or more of these storage technologies, or other devices. The memory 184 may represent a collection of memories of both volatile memory devices and non-volatile memory devices. In additional to the instructions 185, the memory 184 may store data related to candidate workflows, workflow profiles, workflow graphs, deployment graphs, performance metrics, workflow preferences, user role priorities, data structures, programming variables, objects, libraries, files or other information.

Figure 2:
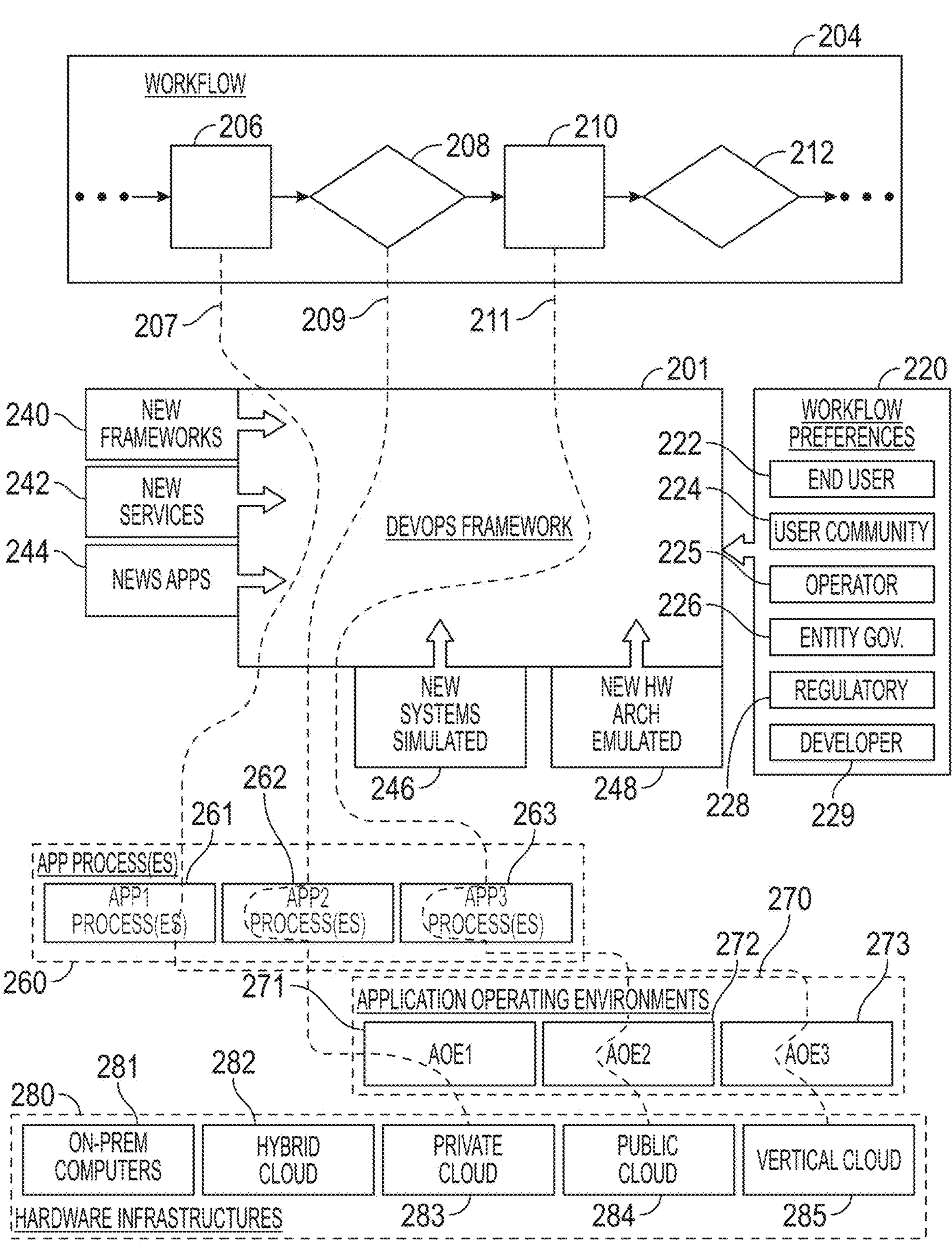
FIG. 2 is an illustration of a workflow solution provided by a DevOps automation framework according to an example implementation.

FIG. 2 depicts an illustration 200 of a deployed exemplary workflow 204, as part of a workflow solution that is provided by a DevOps framework (e.g., the DevOps framework 164 of FIG. 1). For this example, the workflow 204 includes a sequential arrangement of workloads 206, 208, 210 and 212, among other potential workloads. In an example, the workloads 206 and 210 correspond to respective processing stages, and the workloads 208 and 212 correspond to respective data extraction or data assembly stages. It is noted that the workflow 204 is merely an example, as a given workflow may vary from the workflow 204 (e.g., workflows may have parallel workloads, different sequential arrangements of workloads and different workloads), in accordance with further implementations.

As depicted in FIG. 2, the workloads of the exemplary workflow 204 have respective associated application processes 260, application operating environments 270 and hardware infrastructure 280. The associations for the workloads 206, 208 and 210 are depicted by deployment association paths 207, 209 and 211, respectively, of FIG. 2. More specifically, corresponding to the association path 207, the workload 206 is associated with APP1 process(es) 261; the APP1 process(es) 261 execute in an AOE3 application operating environment 273; and the AOE3 application operating environment 273 is hosted by a vertical cloud 285. Corresponding to the association path 209, the workload 208 is associated with APP2 process(es) 262; the APP2 process (es) 262 execute in an AOE1 application operating environment 271; and the AOE1 application operating environment 271 is hosted by a private cloud 283. Also for the example of FIG. 2, corresponding to the association path 211, the workload 210 is associated with APP3 process(es) 263; the APP3 process(es) 263 execute in an AOE2 application operating environment 272; and the AOE2 application operating environment 272 is hosted by a public cloud 284.

The DevOps framework 201 considers a variety of workflow preferences 220. These preferences may be provided and associated with a number of user roles. In examples, the user roles may include an end user 222, a user community 224, an operator 225, an entity governance 226, a regulatory authority 228 and a developer 229. As also depicted in FIG. 2, the DevOps framework 201 may be updated by new framework additions 240, new services 242 and new applications 244. The DevOps framework 201 may also be updated by the results of new system simulations 246 and new hardware architecture emulations 248.

Figure 3:
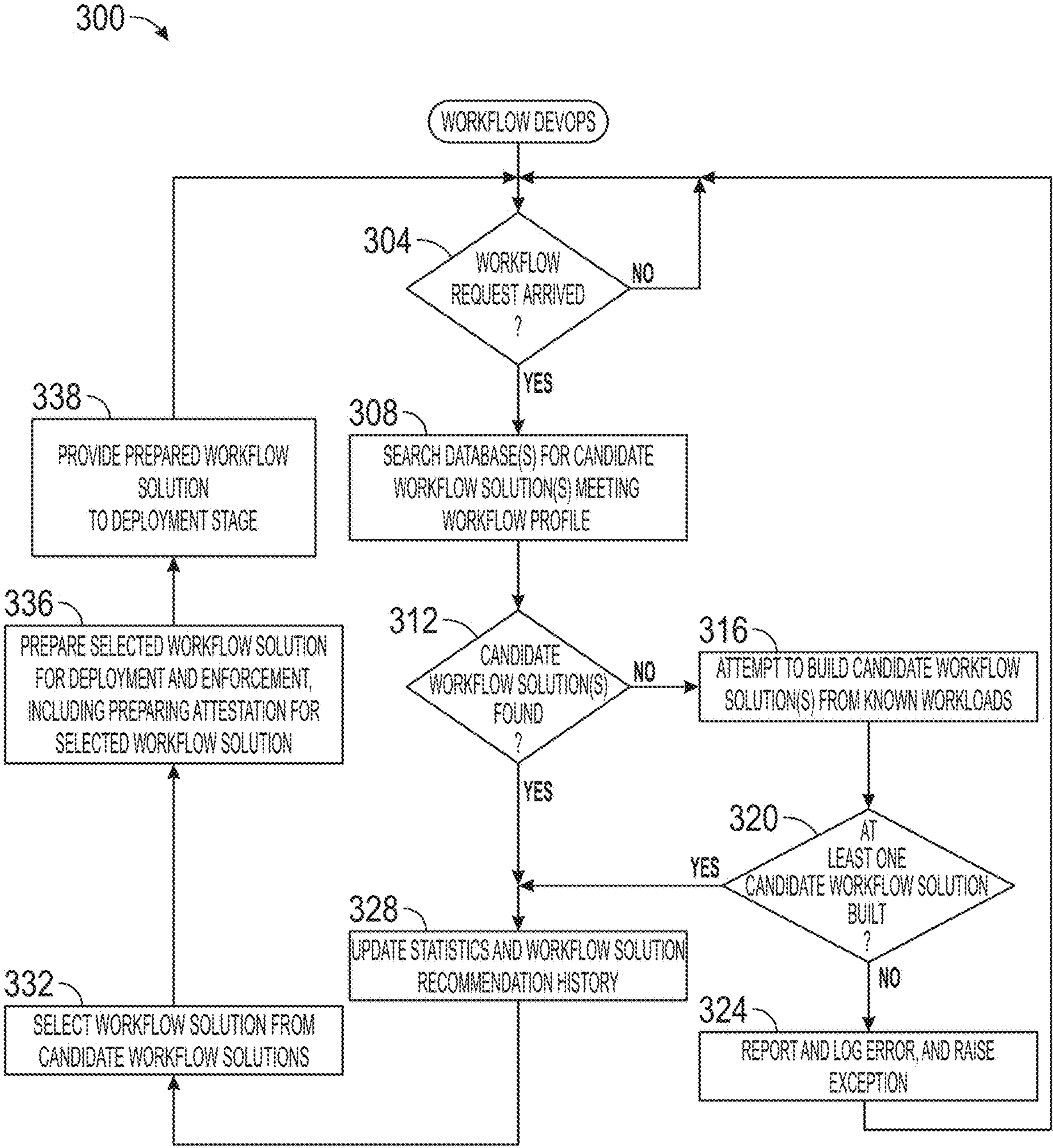
FIG. 3 is a flow diagram depicting a technique to respond to a workflow solution request to recommend, prepare and deliver a workflow solution according to an example implementation.

FIG. 3 is a flow diagram illustrating a technique 300 to provide a workflow solution in accordance with example implementations. In an example, a recommendation agent, such as recommendation agent 171 of FIG. 1, may perform the technique 300.

Referring to FIG. 3, the technique 300 includes the recommendation agent determining (decision block 304) whether a user request for a workflow solution has arrived. If so, then the recommendation agent, pursuant to block 308, searches one or multiple databases for candidate workflow solutions that meet the profile for the workflow solution. In this regard, the profile for the workflow solution may include, in accordance with example implementations, multiple preferences that are associated with multiple user roles. Moreover, searching for candidate workflow solutions, in accordance with example implementations, includes identifying workflow graphs and considering associated workload templates and deployment graphs associated with the workflow solutions. The searching further includes determining whether the identified workloads, the associated corresponding application operating environments and corresponding associated hardware infrastructures meet, or satisfy, the preferences of the user workflow profile. The searching may result in finding one or multiple candidate workflow solutions.

Pursuant to decision block 312, the recommendation agent makes a determination of whether any candidate workflows were found in the search. If not, then, pursuant to block 316, the recommendation agent attempts to build, or construct, candidate workflow solutions from known workloads. In accordance with example implementations, constructing a workflow solution from known workloads includes considering whether the workloads and associated application operating environments and hardware infrastructures meet, or satisfy, the preferences of the workflow profile. If, pursuant to decision block 320, the recommendation agent determines that no candidate workflow solution was built, then the recommendation agent, pursuant to block 324, reports and logs the error, and, as also depicted in block 324, the recommendation agent raises an exception with the user who submitted the workflow request.

If a determination is made, pursuant to decision block 320, that at least one candidate workflow solution was constructed, then a workflow solution may be provided. Pursuant to block 328, the recommendation agent updates the statistics and recommendation history. In an example, this update may include updating current QoS, security, functionality and cost attributes found by the DevOps framework. If there are multiple candidate workflow solutions, then, the recommendation agent, selects a workflow solution from the candidate workflow solutions, as depicted in block 332. An example approach to select a workflow solution from multiple candidate workflow solutions is discussed below in connection with FIG. 4.

The process 300 further includes, in accordance with example implementations, the recommendation agent to be preparing (block 336) the selected workflow solution for deployment and enforcement. Pursuant to block 338, the recommendation agent then provides the prepared workflow solution to the deployment stage.

Figure 4:
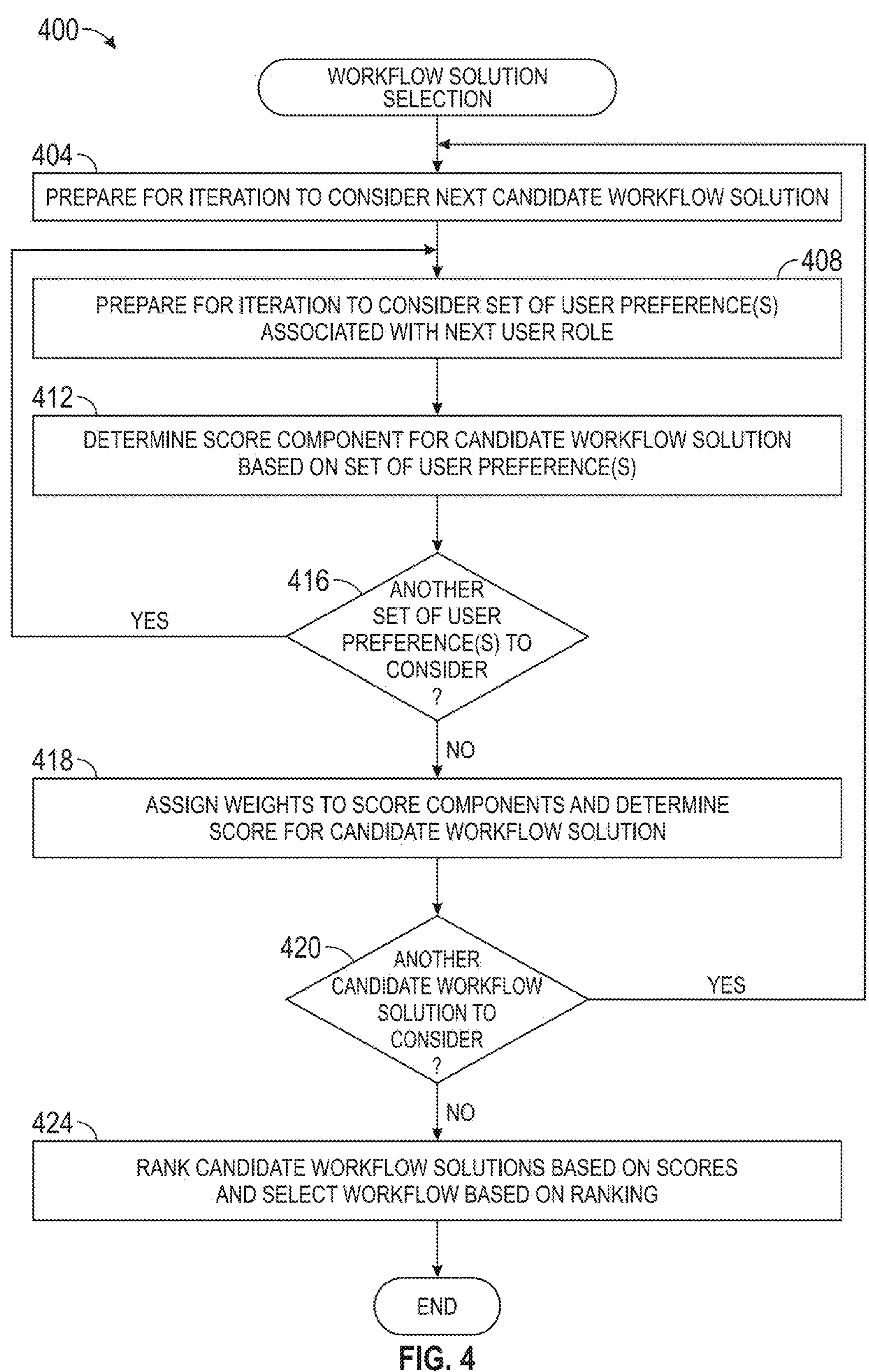
FIG. 4 is a flow diagram depicting a technique to select a workflow solution according to an example implementation.

FIG. 4 is a flow chart depicting a technique 400 to select a workflow solution in accordance with example implementations. In an example, a recommendation agent, such as the recommendation agent 171 of FIG. 1, may perform the technique 400.

Referring to FIG. 4, in accordance with some implementations, the recommendation agent determines a score for each candidate workflow solution and selects the candidate workflow solution having the largest score. More specifically, pursuant to block 404, the recommendation agent prepares for a particular iteration to consider the next candidate workflow solution. Each candidate workflow solution iteration, in accordance with example implementations, has multiple iterations to consider the preferences for different roles. Pursuant to block 408, the recommendation agent prepares for the next iteration to consider a particular set of one or multiple user preferences associated with a particular user role.

In an example, each user role may be assigned a weight, such that the user roles may be assigned varying degrees of importance or priority. For example, an entity governance role may be assigned a higher priority than the priority assigned to an end user role. In another example, a government regulator role may be assigned a higher priority than an end user role or a developer role. In accordance with further implementations and as not depicted in FIG. 4, a particular role may not have any priority or importance versus another role, and as such, the inner iteration of FIG. 4 to assign different weighted score components based on the role may not be used.

Pursuant to block 412, the recommendation agent determines the score component for the candidate workflow and for a particular user role based on the corresponding set of user preference(s). Pursuant to decision block 416, if the recommendation agent determines that another set of user preferences are to be considered (i.e., another inner iteration is to occur), then control returns to block 408.

The result of the inner iterations is that a collection of score components, which correspond to different user roles are considered for a particular candidate workflow solution, and, pursuant to block 418, weights may be assigned to the score components for purposes of determining a score for the candidate workflow solution. If, pursuant to decision block 420, the recommendation agent determines that another candidate workflow solution is to be considered (i.e., another outer iteration is to occur), then control returns to block 404. Otherwise, at this point, scores have been assigned to all of the candidate workflow solutions, and, pursuant to block 424, the recommendation agent ranks the candidate workflow solutions based on the scores and selects a workflow solution from the candidate workflow solutions based on the ranking.

Figure 5:
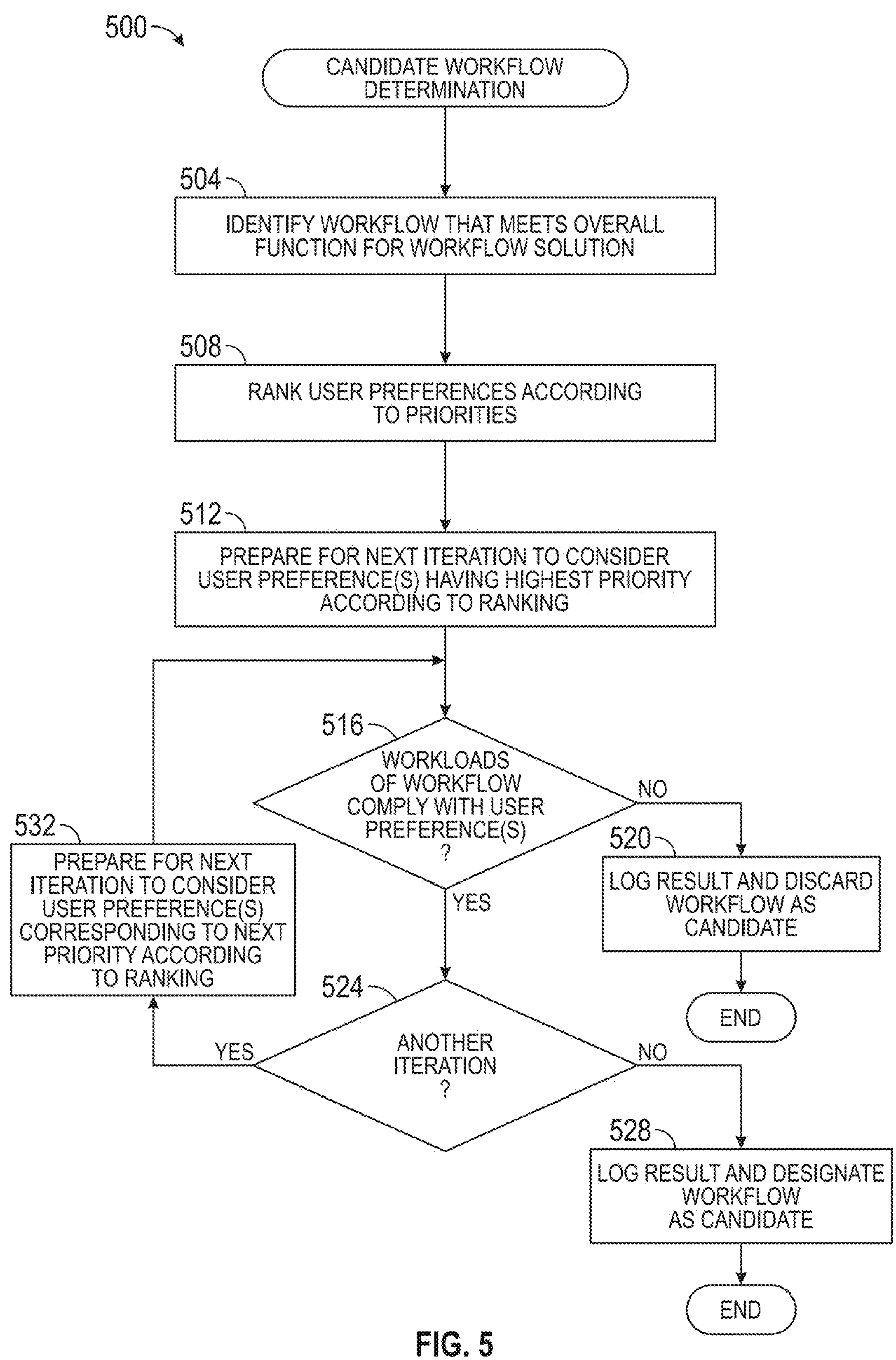
FIG. 5 is a flow diagram depicting a technique to determine a candidate workflow according to an example implementation.

FIG. 5 is a flow diagram depicting a technique 500 to determine, or identify, a candidate workflow. In an example, the technique 500 may be used to identify a candidate workflow solution in block 308 of FIG. 3. In an example, a recommendation agent, such as the recommendation agent 171 of FIG. 1, may perform the technique 500.

Referring to FIG. 5, in accordance with example implementations, pursuant to block 504, the recommendation agent identifies a particular workflow that meets an overall function, or goal, for a particular workflow solution. Pursuant to block 508, the recommendation agent acquires, or accesses, priorities for different user preferences such that the user preferences are ranked according to the priorities. In an example, preferences associated with certain roles (regulator roles and corporate governance roles) may have higher respective weights, or priorities, as compared to preferences associated with other roles (e.g., an end user role).

In an example, the recommendation agent performs the technique 500 using one or multiple iterations, where each iteration considers the user preference(s) corresponding to a particular role. In another example, the recommendation agent may evaluate the workflow using parallel processes. Pursuant to block 512, the recommendation agent prepares for the next iteration to consider the user preference(s) that have the highest priority according to the priority ranking.

Pursuant to decision block 516, the recommendation agent determines whether the workloads of the workflow comply with the user preference(s). In an example, evaluating whether the workloads comply with a particular user preference includes determining whether the workloads meet a minimum threshold imposed by the user preference. In another example, determining whether the workloads comply with a particular user preference includes determining whether or not the workloads have a particular characteristic (e.g., whether the workloads are hosted on hardware infrastructures located within a particular geographical boundary). If, pursuant to decision block 516, the recommendation agent determines that the workloads do not comply with any of the user preference(s), then the recommendation agent, pursuant to block 520, logs the result and discards the workflow as a candidate.

Pursuant to decision block 524, the recommendation agent determines whether another iteration of the technique 500 is to be performed. In an example, the recommendation agent may determine all of the user preferences, with each iteration considering the preferences associated with a particular role for purposes of determining whether the workflow complies with the preferences. In another example, the recommendation agent considers the preferences associated with the top N preferences. In another example, the recommendation agent may be configured to require user preferences associated with certain roles and attempt to find workflow solutions that comply with other user roles.

If, pursuant to decision block 524, the recommendation agent determines that another iteration is not to be performed, then the recommendation agent, pursuant to block 528, logs the result and designates the workflow solution as a candidate. Otherwise, if, pursuant to decision block 524, another iteration is to be performed, then, pursuant to block 532, the recommendation agent prepares for the next iteration to consider the user preference(s) corresponding to the next priority according to the ranking, and control returns to decision block 516.

Referring to FIG. 6, in accordance with example implementations, a technique 600 includes receiving (block 604), by a processor-based recommendation agent, a workflow request. The request is associated with a given user role of a plurality of user roles. In an example, the plurality of user roles may include an end user role, a developer role, a regulatory role, an entity governance role and a community organization role. In an example, the given user role may be associated with an end user role.

In an example, the workflow request may include data representing a name for a workflow solution. In an example, the workflow request may include data that represents a graph of workflows for a workflow solution. In an example, the workflow request may include data that represents a deployment graph for a workflow solution. In an example, the workflow request may include data representing a preference for a workflow solution. In an example, a workflow request may include data representing a workflow name for a workflow solution, a graph of workloads for the workflow solution, a deployment graph for the workflow solution, a quality-of-service preference for the workflow solution and an attestation for the workflow solution.

The technique 600, in accordance with example implementations, includes, pursuant to block 608, responsive to the request, providing a workflow solution to comply with a collection of development and operation preferences. Pursuant to block 608, providing the workflow solution includes identifying, by the recommendation agent, a plurality of candidate workflow solutions. Identifying the plurality of candidate workflow solutions includes, for a given candidate workflow solution, selecting the given candidate workflow solution based on the collection of preferences and templates corresponding to respective workloads of the given candidate workflow solution. In an example, the templates may be TOSCA templates. In an example, the candidate workflow solutions may be previous deployed workflow solutions. In an example, identifying the plurality of candidate workflow solutions includes selecting the candidate workflow solutions based on observed metrics associated with the workflow solutions. In an example, identifying the candidate workflow solutions includes using a marketplace broker service to determine cost information for the candidate workflows. In an example, identifying the candidate workflow solutions includes using a performance assessment service to determine current performance metrics associated with the candidate workflow solutions. In an example, identifying the candidate workflow solution includes using a security assessment service to determine current security metrics for the candidate workflow solution.

Pursuant to block 608, providing the workflow solution includes ranking, by the recommendation agent, the plurality of candidate workflow solutions. In an example, ranking the plurality of candidate workflow solutions include assigning scores to the candidate workflow solutions. In an example, assigning a score to a candidate workflow solution includes determining score components associated with preferences for a particular user role. In an example, the score components corresponding to different user roles may be weighted based on priorities associated with the user roles.

The process 600 includes, pursuant to block 608, responsive to the ranking, selecting, by the recommendation agent, a candidate workflow solution to provide a corresponding selective workflow solution. In an example, selecting a candidate workflow solution includes selecting the candidate workflow solution having the highest score. Pursuant to block 608, an attestation is provided corresponding to the selected workflow solution. In an example, the attestation may include a manifest of components of the workflow solution. In an example, the manifest may be cryptographically-signed. In an example, the attestation may include a cryptographic hash, or signature.

Figure 7:
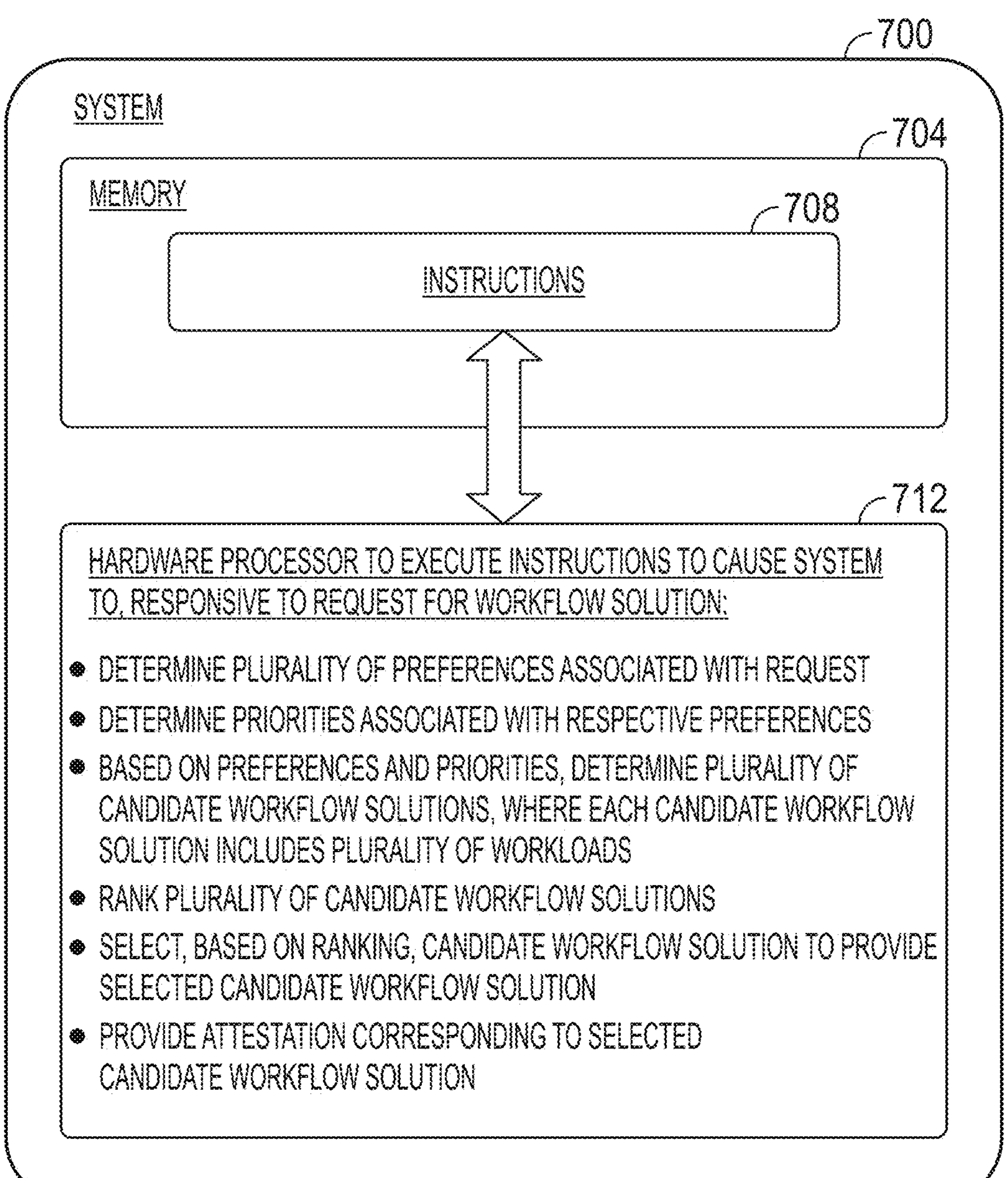
FIG. 7 is a block diagram of a system to provide a workflow solution according to an example implementation.

Referring to FIG. 7, in accordance with example implementations, a system 700 includes a memory 704 and a hardware processor 712. The memory 704 stores machine-readable instructions 708. In an example, the system 700 may be a private cloud. In another example, the system 700 may be a public cloud. In another example, the system 700 may be a private cloud. In another example, the system 700 may include private, non-cloud-based resources. In another example, the system 700 may include on-premise resources of a business enterprise, which are managed by a cloud provider other than the business enterprise. In an example, the memory 704 represents a collection of non-transitory storage devices, such as semiconductor storage devices, memristor-based storage devices, magnetic storage devices, phase change memory devices, a combination of devices of one or more of these storage technologies, or other devices. In examples, the hardware processor 712 may include one or multiple CPU cores or GPU cores.

The hardware processor 712 executes the instructions 708 to cause the system 700 to, responsive to a request for a workflow solution, determine a plurality of preferences associated with the request; and determine priorities associated with respective preferences. In an example, the request for a workflow solution may be an API request. In an example, the workflow request may have any of a wide range of specificity. In an example, a workflow request may specify a name for the requested workflow solution. In an example, the workflow request may specify a deployment graph for a requested workflow solution. In an example, the workflow request may specify a preference for a requested workflow solution. In an example, the workflow request may specify a workflow graph for a requested workflow solution. In an example, the execution of the instructions 708 by the hardware processor 712 causes the system 700 to associate the workflow solution with a workflow profile corresponding to a user role associated with the request.

Responsive to the request for the workflow solution, the instructions 708 cause the hardware processor 712 to cause the system 700 to, based on the preferences and the priorities, determine a plurality of candidate workflow solutions. Each candidate workflow solution includes a plurality of workloads. In an example, a workload includes one or multiple application processes. In an example, a candidate workflow solution includes, for each workload, an application operating environment and a supporting hardware infrastructure. In examples, an application operating environment may be or include a bare metal environment, a virtual machine, a container or an orchestrated container environment. In examples, a hardware infrastructure may be or include a private cloud, a public cloud, on-premise resources, non-cloud-based resources, a vertical cloud or a hybrid cloud.

The hardware processor 712 executes the instructions 708 to cause the system 700 to, responsive to the request for the workflow solution, rank the plurality of candidate workflow solutions; select, based on the ranking, a candidate workflow solution to provide a selected candidate workflow solution; and provide an attestation corresponding to the selected candidate workflow solution. In an example, ranking the candidate workflow solutions includes ordering the candidate workflow solutions based on the priorities. In an example, selecting the candidate workflow solution includes selecting the candidate workflow solution have the highest priority. In an example, providing the attestation includes providing a manifest of components of the selected candidate workflow solution. In example, providing the attestation includes providing a cryptographic signature of the manifest.

Figure 8:
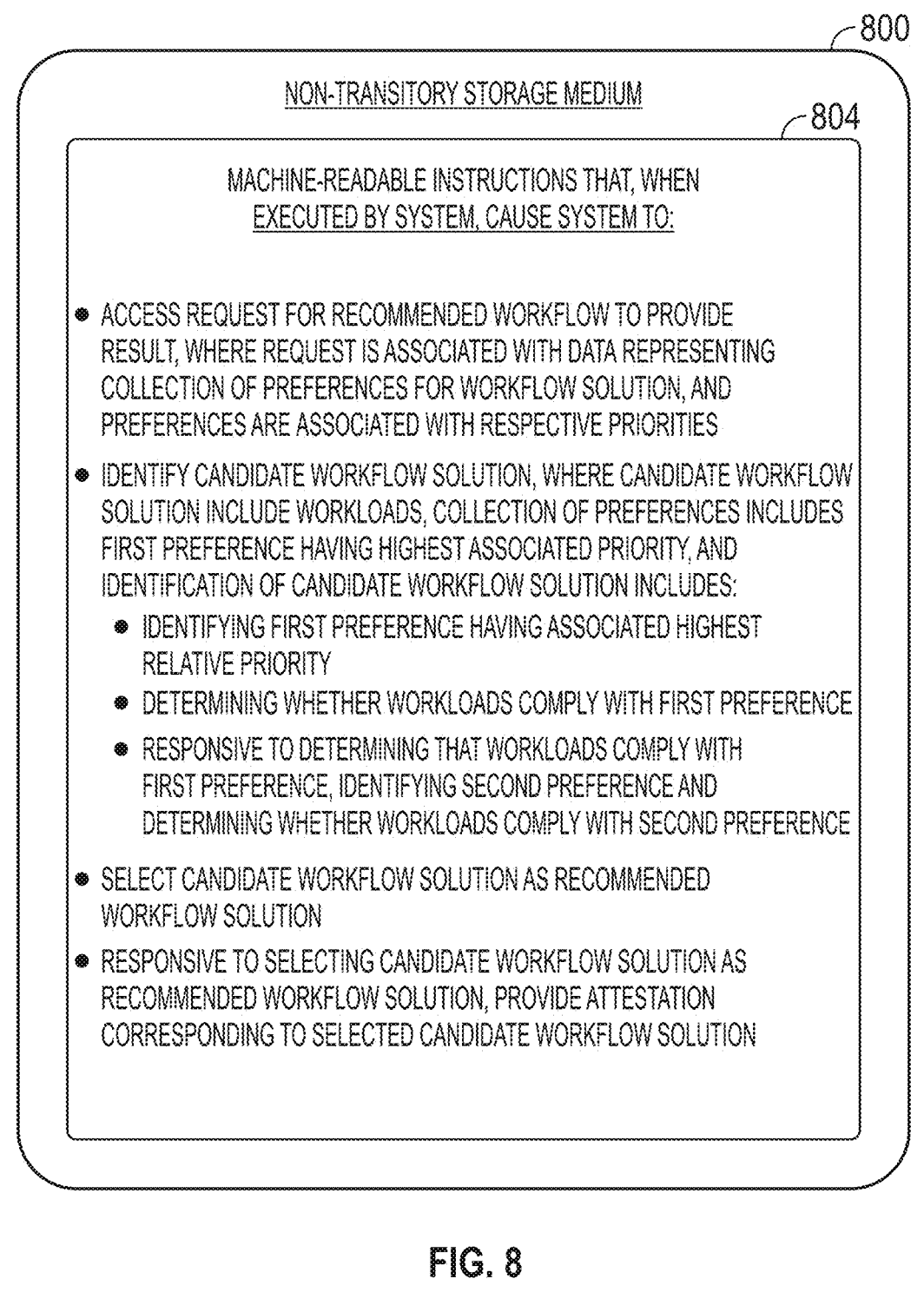

Referring to FIG. 8, a non-transitory storage medium 800 stores machine-readable instructions 804 that, when executed by a system, cause the system to access a request for a recommended workflow solution. In an example, the system 700 may include one or multiple actual, or physical, machines. The request is associated with data representing a collection of preferences for the workflow solution, and the preferences are associated with respective priorities. In an example, the request may be a REST API request. In another example, the request may be a gRPC request. In an example, the request includes data representing one or multiple preferences of the collection of preferences. In an example, the request may be associated with a workflow profile that includes one or multiple preferences of the collection of preferences. In an example, the collection of preferences corresponds to a workflow profile, and the system adds one or multiple preferences represented by data of the request to the workflow profile.

The instructions 804, when executed by the system, further cause the system to identify a candidate workflow solution. The candidate workflow solution includes workloads. The collection of preferences includes a first preference having the highest associated priority of the respective priorities. In an example, a workload includes one or multiple application processes. In an example, the candidate workflow solution includes, for each workload, an application operating environment and a supporting hardware infrastructure. In examples, an application operating environment may be or include a bare metal environment, a virtual machine, a container or an orchestrated container environment. In examples, a hardware infrastructure may be or include a private cloud, a public cloud, on-premise resources, non-cloud-based resources, a vertical cloud or a hybrid cloud.

The identification of the candidate workflow solution includes identifying the first preference and determining whether the workloads comply with the first preference. The identification of the candidate workflow solution includes, responsive to determining that the workloads comply with the first preference, identifying a second preference of the collection of preferences based on the priorities. The identification of the candidate workflow solution includes determining whether the workloads comply with the second preference. In an example, the first or second preference may be associated with an end user role, a developer role, a business entity governance role, a community group role or a regulator role. In an example, first or second preference may be associated with a cost, a security attribute, performance attribute or a functionality for the workflow solution.

The instructions 804, when executed by the system, further cause the system to select the candidate workflow solution and responsive to selecting the candidate workflow solution, providing an attestation corresponding to the candidate workflow solution. In an example, providing the attestation includes providing a manifest of components of the selected candidate workflow solution. In example, providing the attestation includes providing a cryptographic signature of the manifest.

In accordance with example implementations, the request further associates the preferences with respective priorities. The respective priorities include a first priority having the highest priority. Selecting the given candidate workflow solution includes determining that the workflows of the given candidate workflow solution comply with the preferences associated with the first priority. A particular advantage is that workflow solutions may be quickly composed and deployed in a reliable and secure manner.

In accordance with example implementations, the respective priorities further include a second priority other than the first priority. Selecting the given candidate workflow solution includes determining that the workloads of the given candidate workflow solution comply with the preference associated with the second priority. A particular advantage is that workflow solutions may be quickly composed and deployed in a reliable and secure manner.

In accordance with example implementations, the respective priorities further include a second priority other than the first priority. Selecting the given candidate workflow solution includes determining at least one workload of the workloads of the given candidate workflow solution does not comply with the preferences associated with the second priority. A particular advantage is that workflow solutions may be quickly composed and deployed in a reliable and secure manner.

In accordance with example implementations, the candidate workflow solutions includes cloud-based workflow solutions. A particular advantage is that workflow solutions may be quickly composed and deployed in a reliable and secure manner.

In accordance with example implementations, selecting the given candidate workflow solution includes determining that the given candidate workflow solution complies with a preference associated with a user role of the plurality of user roles other than the given user role. A particular advantage is that workflow solutions may be quickly composed and deployed in a reliable and secure manner.

In accordance with example implementations, selecting the given candidate workflow solution includes determining that the given candidate workflow solution complies with a preference of the collection of preferences based on an observed history of the given candidate workflow solution. A particular advantage is that workflow solutions may be quickly composed and deployed in a reliable and secure manner.

In accordance with example implementations, selecting the candidate workflow solution includes selecting a workflow having workflows deployed on cloud-based resources and non-cloud-based resources. A particular advantage is that workflow solutions may be quickly composed and deployed in a reliable and secure manner.

In accordance with example implementations, the request is further associated with a workload graph; and identifying the plurality of candidate workflow solutions further includes selecting candidate workflow solutions based on workloads identified by the workload graph. A particular advantage is that workflow solutions may be quickly composed and deployed in a reliable and secure manner.

The detailed description set forth herein refers to the accompanying drawings. Wherever possible, the same reference numbers are used in the drawings and the foregoing description to refer to the same or similar parts. It is to be expressly understood, however, that the drawings are for the purpose of illustration and description only. While several examples are described in this document, modifications, adaptations, and other implementations are possible. Accordingly, the detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "connected," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:

receiving, by a processor-based recommendation agent, a workflow request, wherein the request is associated with a given user role of a plurality of user roles; and responsive to the request, providing a selected workflow solution to comply with a collection of development and operation preferences, wherein providing the selected workflow solution comprises:

identifying, by the recommendation agent, a plurality of candidate workflow solutions based on the collection of development and operation preferences, wherein identifying the plurality of candidate workflow solutions comprises, for a given candidate workflow solution of the plurality of candidate workflow solutions, selecting the given candidate workflow solution based on the collection of preferences and templates, wherein each candidate workflow solution of the plurality of candidate workflow solutions comprises application process-based workloads, a workflow topography of the workloads, hardware infrastructures that host the workloads and application operating environments that host the workloads;

ranking, by the recommendation agent, the plurality of candidate workflow solutions based on priorities assigned to respective user roles of the plurality of user roles and associations between the respective user roles and the development and operation preferences; and responsive to the ranking, selecting, by the recommendation agent, a candidate workflow solution of the plurality of candidate workflow solutions to provide the selected workflow solution, wherein providing the selected workflow solution comprises identifying components of the selected workflow solution and providing an attestation corresponding to the selected workflow solution, wherein the components comprise the workloads, the workflow topography, the hardware infrastructures and the application operating environments of the selected workflow solution, and wherein providing the attestation comprises providing a manifest of the components and cryptographically signing the manifest.

2. The method of claim 1, wherein:

the request further associates the preferences of the collection of preferences with respective priorities of the priorities;

the respective priorities comprise a first priority having the highest priority among the respective priorities; and selecting the given candidate workflow solution comprises determining that the workloads of the given candidate workflow solution comply with the preference associated with the first priority.

3. The method of claim 2, wherein:

the respective priorities further comprise a second priority other than the first priority; and selecting the given candidate workflow solution comprises determining that the workloads of the given candidate workflow solution comply with the preference associated with the second priority.

4. The method of claim 2, wherein:

the respective priorities further comprise a second priority other than the first priority; and selecting the given candidate workflow solution comprises determining that at least one workload of the workloads of the given candidate workflow solution does not comply with the preference associated with the second priority.

5. The method of claim 1, wherein the plurality of candidate workflow solutions comprises a plurality of cloud-based workflows.

6. The method of claim 1, wherein selecting the given candidate workflow solution comprises determining that the given candidate workflow solution complies with a preference associated with a user role of the plurality of user roles other than the given user role.

7. The method of claim 1, wherein selecting the given candidate workflow solution comprises determining that the given candidate workflow solution complies with a preference of the collection of preferences based on an observed history of the given candidate workflow solution.

8. The method of claim 1, wherein selecting the candidate workflow solution comprises selecting a workflow having workloads deployed on cloud-based resources and non-cloud-based resources.

9. The method of claim 1, wherein the request is further associated with a workload graph; and identifying the plurality of candidate workflow solutions further comprises selecting candidate workflow solutions of the plurality of candidate workflow solutions based on workloads identified by the workload graph.

10. The method of claim 1, wherein the plurality of user roles comprises a software developer and a regulator.

11. The method of claim 1, wherein the plurality of user roles comprises at least one of an end user role, a role associated with a developer, a role associated with a cloud-based operator, a role associated with a government regulator, or a role associated with corporate policy compliance.

* * * * *